May 23, 1961  I. M. SARGEANT  2,985,437
IMPROVEMENT DEVICE FOR CONVEYOR TYPE HEAT TREATING FURNACES
Filed May 14, 1959
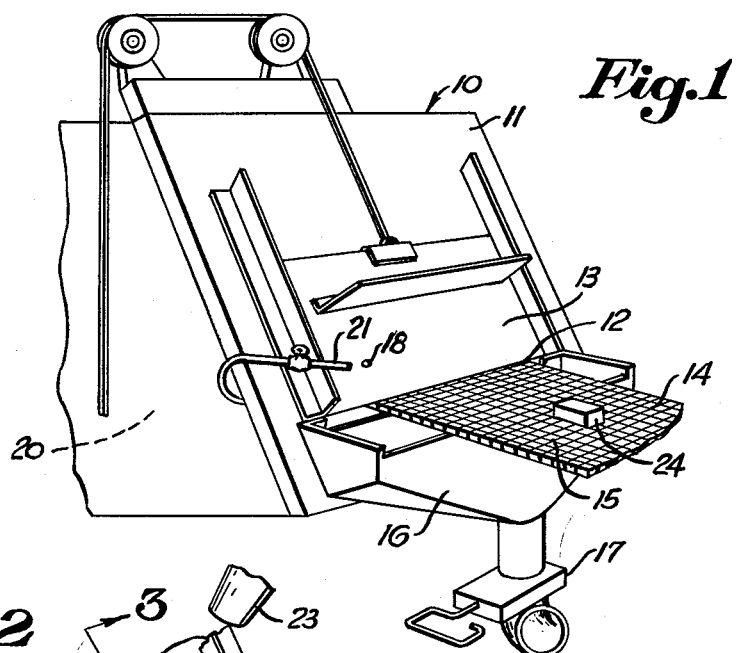
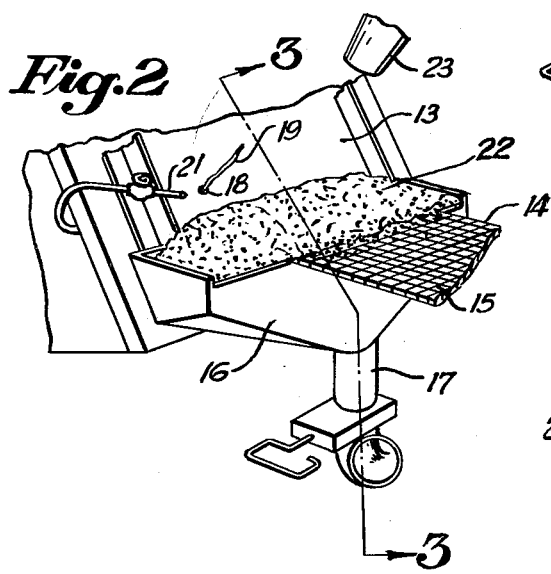
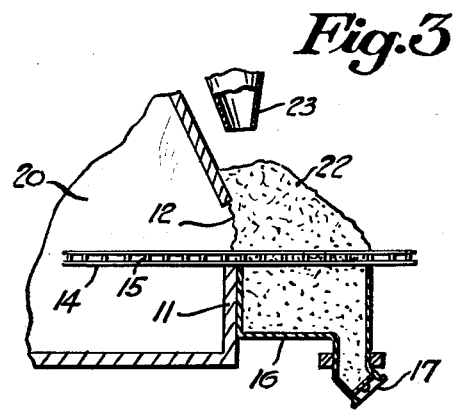
INVENTOR.
IRVIN M. SARGEANT
BY Richards and Geier
ATTORNEYS

United States Patent Office 2,985,437
Patented May 23, 1961

2,985,437

IMPROVEMENT DEVICE FOR CONVEYOR TYPE HEAT TREATING FURNACES

Irvin M. Sargeant, 170 York Ave., Pawtucket, R.I.

Filed May 14, 1959, Ser. No. 813,237

2 Claims. (Cl. 263—6)

This invention relates to heat treating furnaces, and refers, more particularly, to heat treating conveyor type furnaces.

Heat treating furnaces having conveyors to carry the metals to be treated into the furnace are known in prior art. For best furnace efficiency, it is necessary to prevent air from entering the furnace. In prior art there have been numerous attempts to achieve this result, including placing loosely hung chains or pliant members across the furnace opening, and projecting a burning gas or a fluid curtain across the furnace opening. None of these methods is very efficient since the hanging chains or pliant members may spread apart allowing air to enter, and the gas or fluid curtain does not give a perfect seal. These prior art methods are particularly unsuitable for sealing the furnace openings during idling periods because of their inefficiency and expense.

An object of the present invention is the provision of a heat treating conveyor type furnace not having the disadvantages of prior art.

Another object is the provision of a heat treating conveyor type furnace which does not allow air to enter the furnace during idling periods such as at night or for a few hours shut down.

Another object is the provision of a heat treating conveyor type furnace which conserves its special internal atmosphere during idling periods.

Still another object is the provision of a heat treating conveyor type furnace which prevents contamination and oxidation within the furnace by excluding air.

A further object is the provision of an inexpensive, easily made conveyor type heat treating furnace which prevents the special internal furnace atmosphere from becoming contaminated, oxidized, or lost.

Other objects of the present invention will become apparent in the course of the following specification.

The heat treating furnace of the present invention allows atmosphere controlled heat treating and eliminates discoloration or scale of the heat treated article. The heat treated article is removed from the furnace as clean and as bright as it was when the heat treating process began. There is no need to polish away any discoloration or to remove any scale. In prior art removal of discoloration and scale could change the dimensions of the heat treated article. This change of dimensions is eliminated by the heat treating process made possible by the present invention, because of the absolute control of the internal atmosphere of the furnace. The heat treating furnace of the present invention makes high precision work possible. Another feature of the present invention is the chamber that runs the entire length of the furnace, and in which the work travels during the heat treating. This chamber enables an oxygen free passage of the work through the heating cycle. By using the novel method of the present invention of closing the openings of the chamber during idling periods, this oxygen free passage is further guaranteed, and results in the high quality of work heretofore described.

The objects of the present invention may be realized through the provision of a conveyor type heat treating furnace with funnel shaped hoppers disposed adjacent to the openings at which the conveyor enters and leaves the furnace. The hoppers are connected to the furnace just beneath the furnace openings. A mass of inert granular flowable material is built up on the hopper so that the furnace opening is completely covered thereby during idling periods.

The invention will appear more clearly from the following detailed description when taken in connection with the accompanying drawings, showing, by way of example, preferred embodiments of the inventive idea.

In the drawing:

Figure 1 is a perspective view of a heat treating conveyor type furnace of the present invention showing the entrance to the furnace;

Figure 2 is a perspective view of a heat treating conveyor type furnace of the present invention showing inert material placed at the entrance to the furnace;

Figure 3 is a sectional view along line 3—3 of Figure 2;

One end of a heat treating conveyor type furnace 10 of the present invention is shown in Figure 1 and comprises a furnace body portion 11, an entrance opening 12, a movable furnace door 13 which opens and closes the entrance opening 12, a conveyor belt 14 made of heat resistant mesh or links 15 which traverses the entire length of the furnace 10, and a funnel shaped hopper 16 having a draw-off outlet 17.

In the furnace door 13 is an escape port 18 which allows only a desired small amount of the special atmosphere 19 to leave the furnace chamber 20. Adjacent to the port 18 is a pilot light 21 which burns off the special atmosphere 19 as it escapes (Figure 2).

An inert flowable mass of material 22, such as an inert flowable granular material in the nature of sand, is piled up upon the hopper 16 such as to cover the opening 12.

The entrance and exit ends of the furnace operate in essentially the same manner and the description is, therefore, with respect to the furnace entrance.

The manner of operation and use of the heat treating conveyor type furnace 10 of the present invention is as follows:

The furnace 10 is heated up in any known manner, and the conveyor belt 14 is then started in motion and moves the articles 24 to be heat treated into the furnace chamber 20. Upon completion of the heat treating the articles 24 are removed from the furnace 10. When an idling period is then contemplated an inert flowable material 22 is fed into the hopper 16 from an overhead hopper 23 until the inert material 22 completely covers the conveyor belt 14 and the opening 12.

The mass of inert material 22 flows around the links 15 and tends to retain its piled up shape and to remain in such a pile directly over the hopper 16. Thus, the inert flowable material 22 seals the furnace chamber 20 without allowing any air from outside the furnace 10 to enter the chamber 20 and without allowing any of the special atmosphere 19 within the chamber 20 from escaping. This is true since while the inert flowable material 22 is in place, as described above, the opening 12 is completely covered.

When desired the inert material 22 may be removed through the draw-off outlet 17 in order to allow admittance to the furnace 10 through the opening 12.

The operation at the furnace exit is similar to the operation just described at the furnace entrance.

Among the advantages of the present invention are the following:

Air is prevented from entering the furnace chamber, and the special atmosphere is prevented from leaving the chamber, during idling periods of the furnace; a perfect air-tight seal is achieved at the furnace openings; since no air is permitted to enter the furnace chamber during the idling period, no time is lost in impurging before the heat treating process is begun again; the inert material is clean, safe, and easily handled and controlled; the treated article does not discolor nor scale; the treated article is as bright and clean as it was when the heat treatment process began; there is no need to polish away discoloration or remove scale and, therefore, the dimensions of the article remain unchanged, allowing for the treatment of high precision articles; and the present invention is inexpensive to manufacture and is easily installed and operated.

It is apparent that the described examples are capable of many variations and modifications within the scope of the present invention. All such variations and modifications are to be included within the scope of the present invention.

What is claimed is:

1. In combination with a heat treating furnace comprising a furnace body enclosing a heating chamber and having at least one opening, a perforated movable conveyor belt extending through said opening and said chamber, and a movable door carried by said furnace body and located over said opening and directly above said conveyor belt in the closed position of said door, said furnace having air gaps providing communication between said chamber and the outside atmosphere in said closed position of the door through said perforations of the conveyor belt and spaces between the conveyor belt and the edges of said opening; a device for sealing said air gaps during idling periods of said furnace, said device comprising an elongated hopper connected to said furnace body and located directly below said opening and the portion of the conveyor belt extending therethrough, said hopper being funnel-shaped and being adapted to carry a mass of granulated material closing said air gaps, and a draw-off outlet located below said hopper and in communication therewith.

2. In combination with a heat treating furnace comprising a furnace body enclosing a heating chamber and having at least one inclined wall with a transverse opening formed therein, a perforated movable conveyor belt extending through said chamber and said opening and being narrower than said opening, and a door slidably mounted upon said inclined wall and located over said opening and directly above said conveyor belt in the closed position of said door, said furnace having air gaps providing communication between said chamber and the outside atmosphere in said closed position of the door through said perforations of the conveyor belt and spaces between the conveyor belt and the edges of said opening; a device for sealing said air gaps during idling periods of said furnace, said device comprising an elongated hopper connected to said furnace body and located directly below said opening and the portion of the conveyor belt extending therethrough, said hopper being funnel-shaped and being adapted to carry a mass of granulated material closing said air gaps, said door having an escape port formed therein, and a pilot light carried by said furnace body and located adjacent said port for burning off the atmosphere escaping therethrough.

References Cited in the file of this patent

UNITED STATES PATENTS

| 1,712,132 | Breyer et al. | May 7, 1929 |
| 1,792,456 | Willard et al. | Feb. 10, 1931 |

FOREIGN PATENTS

| 18,236 | Denmark | Dec. 1, 1913 |